(12) United States Patent
Seifried

(10) Patent No.: US 9,509,372 B2
(45) Date of Patent: Nov. 29, 2016

(54) BUS COMMUNICATION DEVICE

(71) Applicant: R. Stahl Schaltgeräte GmbH, Waldenburg (DE)

(72) Inventor: Michael Seifried, Schwäbisch Hall (DE)

(73) Assignee: R. STAHL SCHALTGERÄTE GMBH, Waldenburg (DE)

(*) Notice: Subject to any disclaimer, the term of this patent is extended or adjusted under 35 U.S.C. 154(b) by 0 days.

(21) Appl. No.: 14/441,461

(22) PCT Filed: Nov. 6, 2013

(86) PCT No.: PCT/EP2013/073150
§ 371 (c)(1),
(2) Date: May 7, 2015

(87) PCT Pub. No.: WO2014/072333
PCT Pub. Date: May 15, 2014

(65) Prior Publication Data
US 2015/0280783 A1    Oct. 1, 2015

(30) Foreign Application Priority Data
Nov. 9, 2012 (DE) .......... 10 2012 110 732

(51) Int. Cl.
*H04B 3/54* (2006.01)
*H04L 12/10* (2006.01)
*H04L 12/40* (2006.01)

(52) U.S. Cl.
CPC .............. *H04B 3/542* (2013.01); *H04B 3/548* (2013.01); *H04L 12/10* (2013.01); *H04L 12/40045* (2013.01); *H04B 2203/547* (2013.01); *H04B 2203/5487* (2013.01)

(58) Field of Classification Search
CPC   H04B 3/542; H04B 3/548; H04B 2230/547; H04B 2203/5487; H04L 12/10; H04L 12/40045
See application file for complete search history.

(56) References Cited

U.S. PATENT DOCUMENTS

| 5,420,578 A | 5/1995 | O'Brien et al. |
| 6,563,419 B1 * | 5/2003 | Herz .............. H04B 3/50 340/12.15 |

(Continued)

FOREIGN PATENT DOCUMENTS

| DE | 102005026826 A1 | 12/2006 |
| DE | 102010037262 A1 | 4/2011 |

(Continued)

OTHER PUBLICATIONS

International Search Report in corresponding International Application No. PCT/EP2013/073150, dated Dec. 13, 2013, 4 pages.

(Continued)

*Primary Examiner* — Freshteh N Aghdam
(74) *Attorney, Agent, or Firm* — Fitch, Even, Tabin & Flannery LLP

(57) ABSTRACT

A bus communication device (10) includes a bus line (12), a master computer (11) connected to the bus line (12) and several subscriber units (14) connected to the bus line (12) via at least one coupling arrangement (17). The master computer (11) controls a communication via the bus line (12) using a fixed, prespecified communication protocol. The subscriber units (14) can communicate among each other, and one subscriber unit (14) can communicate with the master computer (11) consistent with the bus protocol. The bus line (11) is configured for supplying the subscriber units (14) and/or at least one coupling arrangement (17) with electrical energy for communication. Each subscriber unit (14) can modulate the subscriber current (IT) consistent with a first modulation (M1), and each subscriber unit (14) and/or each coupling arrangement (17) can modulate the current (IT, IK) consistent with a second modulation (M2).

16 Claims, 5 Drawing Sheets

(56) References Cited

U.S. PATENT DOCUMENTS

| | | |
|---|---|---|
| 8,949,665 B2 | 2/2015 | Law et al. |
| 2011/0072175 A1* | 3/2011 | Liaw .................... G06F 13/385 710/73 |
| 2014/0023089 A1 | 1/2014 | Hartwich et al. |

FOREIGN PATENT DOCUMENTS

| | | |
|---|---|---|
| EP | 2073435 A1 | 6/2009 |
| WO | 2009063213 A1 | 5/2009 |
| WO | 2011007142 A1 | 1/2011 |
| WO | 2012038472 A1 | 3/2012 |

OTHER PUBLICATIONS

Priority Search Results in corresponding German Application No. 10 2012 110 732.7, dated May 27, 2014, 26 pages.

Office action in corresponding German Application No. 10 2012 110 732.7, dated Jan. 3, 2013, 15 pages.

HART_appguide_HCF_LIT_34_Copyright_1999, 1999 HART Communications Foundation, 80 pages.

* cited by examiner

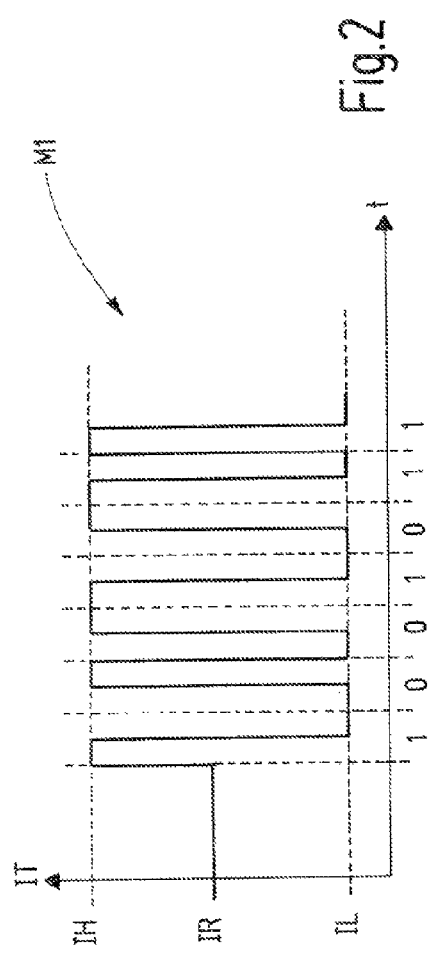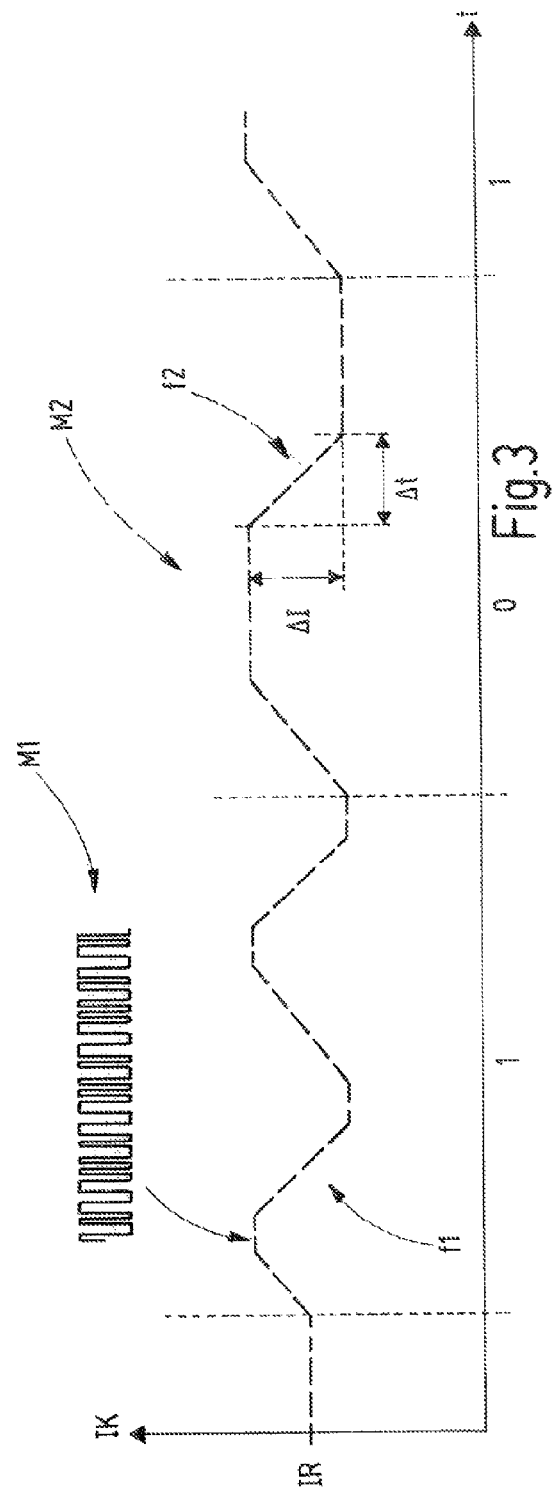

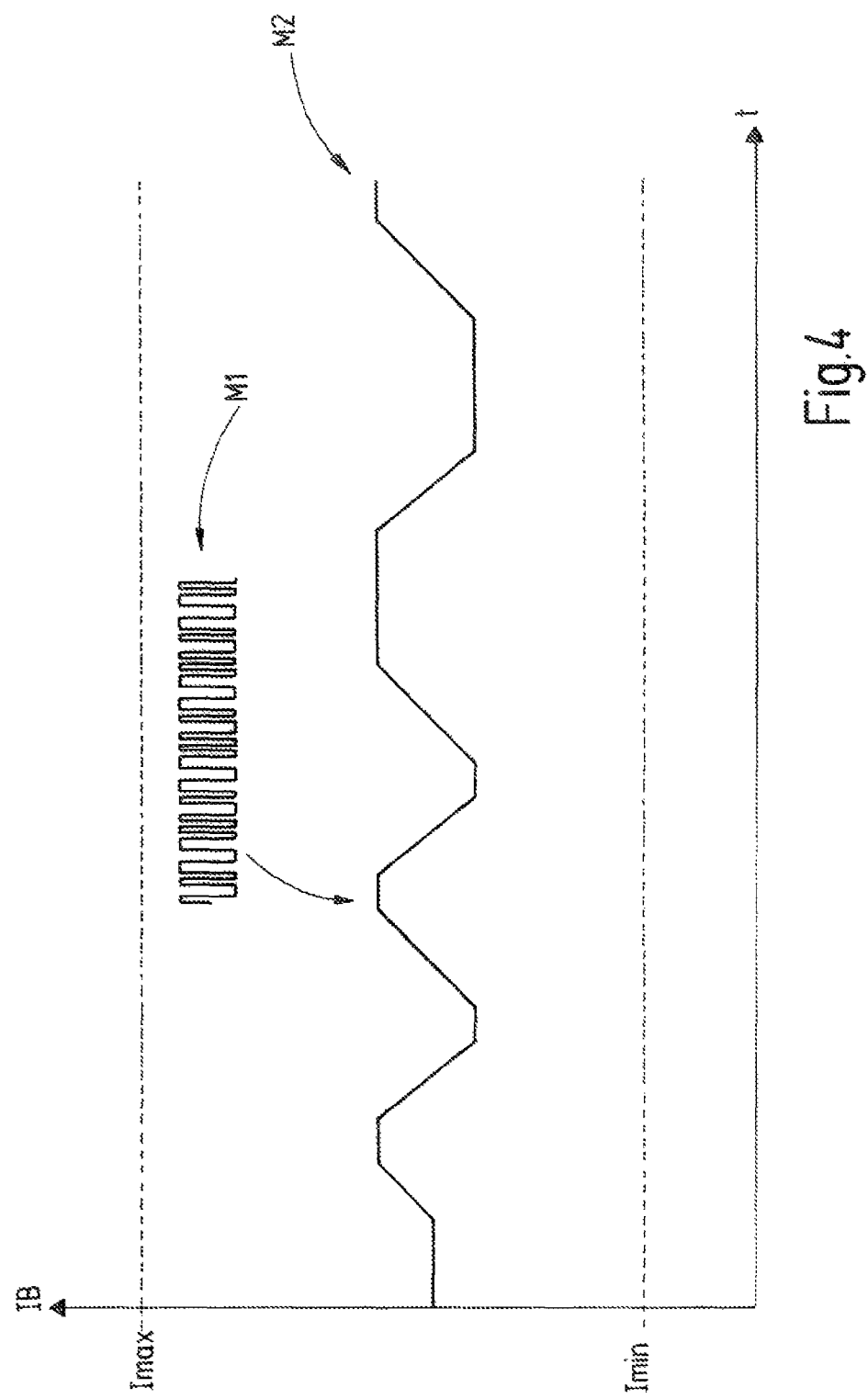

BUS COMMUNICATION DEVICE

CROSS REFERENCE TO RELATED APPLICATIONS

This patent application is the national phase of PCT/EP2013/073150 filed Nov. 6, 2013, which claims the benefit of German Patent Application No. 10 2012 110 732.7 filed Nov. 9, 2012.

TECHNICAL FIELD

The invention relates to a bus communication device. In particular, the bus communication device comprises several subscriber units that are connected to one bus cable, said units communicating with each other consistent with a prespecified communication protocol.

BACKGROUND

In particular, the bus cable comprises two leads. The data transmission is performed via the bus cable consistent with the communication protocol, and also the subscriber units connected to the bus cable are supplied with electrical power. A communication control device is disposed for controlling the communication consistent with the communication protocol.

A bus communication device has been known, for example, from publication DE 10 2010 037 262 A1. This bus communication device comprises an integrated bus control and energy supply device. As a result of this, a transmission of electrical energy in the form of dc current or also in the form of digital signals is possible on a shared bus line. This is referred to as a field bus system.

The simultaneous transmission of data signals on energy supply lines is also known in LAN networks, for example for the use in private homes, via so-called power-line adapters.

Publication WO 2009/063213 A1 describes a communication device with a bus line to which is connected a communication control device or a master computer and in which case at least one subscriber unit is connected by means of a coupling arrangement. In addition, a bus diagnostic unit is connected to the bus line. The coupling arrangement is also connected to a connected subscriber unit via a branch line. Furthermore, the coupling arrangement comprises a subscriber diagnostic unit in order to detect errors in a subscriber unit or in the branch line. The subscriber diagnostic unit controls a spur means that causes a condition on the bus line that deviates from the prespecified values in that it can be detected by the bus diagnostic unit as a deviation. Consequently, an error in a subscriber unit can also be detected and indicated via the bus diagnostic unit even if, for example, a galvanic separation has been established between the bus line and the branch line. The spur means may establish, for example, a low-ohmic connection between a core of the bus line and a ground connection or feed a signal between shielding and bus cores.

SUMMARY

Considering such known communication devices, the object is to expand the functionality scope of the bus communication device and, in particular, to make available improved diagnostic options.

The bus communication device comprises at least one subscriber unit that is connected to at least one coupling arrangement via a branch line. Several subscriber units may be connected to a coupling arrangement. Furthermore, the coupling arrangement is also connected to a bus line. A communication device that is preferably connected to the bus line can control the communication. It may be a master computer that controls the communication of the individual subscriber units by means of a communication protocol. However, it is also possible for the communication device to be at least partially controlled by the subscriber units themselves.

In particular, the bus line is a 2-wire line. The subscriber unit, as well as the optionally existing communication control device, are supplied with electrical energy—for example by means of a dc voltage source—via the bus line. At the same time, a data transmission takes place via the bus line. The electrical current or dc current that flows on the bus line into the at least one subscriber unit can be modulated by the subscriber unit. The subscriber unit is disposed to perform a first modulation of the electrical current consistent with a communication protocol prespecified by the master computer. The first data transmission rate with which data can be transmitted due to the first modulation of the current may be, for example, in the range of 20 to 35 kbit per second and, in particular, at 31.25 kbit per second. For the first modulation, the idle current actually consumed by the subscriber unit is increased or decreased by a prespecified amplitude, as a result of which ascending and descending flanks are formed. These flanks and/or current amplitudes can correspond to digital values. For example, Manchester coding may be used for this first modulation.

This first modulation may be free of DC components, so that the dc current mean value of the current flowing into the subscriber unit remains unchanged due to the first modulation. In the event of extremely low idle currents, the absence of DC components cannot always be ensured.

In accordance with the invention, another communication channel is set up outside the prespecified communication protocol. To accomplish this, the bus line is also used as the transmission medium. This additional communication channel is able to transmit digital data that are generated by at least one second modulation of the coupling arrangement current flowing into a coupling arrangement and/or the subscriber current flowing into a subscriber. One or more different second modulations can also be provided. In particular the coupling arrangement that has until now been configured—as a rule—without communication functionality can transmit a message in this manner due to this second modulation. In particular, for this second modulation of the current, the gradient of the current—i.e., the time-dependent current change—is smaller than the gradient of the current of the first modulation and, for example, smaller than a prespecified gradient maximum value. Due to this differentiation, it is possible to separate data of the first modulation and the second modulation that can be simultaneously transmitted via the bus line.

Due to the second modulation of the coupling arrangement current or the subscriber current, it is possible to transmit data at a second data transmission rate that is smaller by orders of magnitude, for example, approximately smaller by the factor of 1000, than the first data transmission rate. Therefore, the second modulation is suitable, e.g., for the transmission of information that is not time-critical.

For example, the coupling arrangement can detect an error and, in particular, a short circuit in the branch line of a connected subscriber, or in the subscriber, and transmit an error condition message on the bus line by a modulation of the coupling arrangement current consistent with the second modulation. This error status message can only consist of a ramp-shaped current progression of the coupling arrangement current with one ascending and one descending flank, wherein the gradient of the flanks is smaller than the prespecified gradient maximum value. To accomplish this, a highly simple configuration of the coupling arrangement is sufficient. For example, a diagnostic unit that may be a component of the voltage supply or be configured separately therefrom, can thus also be used to determine a short circuit in a branch line. In this event of a short circuit, the current consumption of the affected coupling arrangement displays the characteristic ramp-shaped progression that corresponds to a simple current signal consistent with the second modulation.

The second modulation of the current is preferably a prespecified correlation function, wherein the frequency and/or amplitude of the current consumption are modulated. A pure frequency modulation is also possible. Considering frequencies for the second modulation within the range of 0 to 10 Hz, for example, correspondingly greater amplitudes of the frequency-modulated current can be selected than, e.g., at frequencies within the range of 50 to 60 Hz. For the second modulation, low frequencies of less than 20 Hz or, in particular, less than 10 Hz can be selected in order to achieve a greater signal to noise ratio. In addition to the amplitude and/or frequency modulations, it is possible, alternatively or additionally, to use additional modulation methods such as, e.g., the square amplitude modulation or the so-called "frequency shift keying (FSK)", or another digital modulation with one or more carriers.

By way of this additional communication channel set up by the second modulation of the current it is possible to transmit, in particular, diagnostic data and/or status information and/or allocation information and/or capacity utilization information or the like by means of the coupling arrangement and/or the subscriber unit, for example, to a higher-level asset management system. By means of this asset management system it is possible, for example, to control and/or monitor several bus communication devices. Therefore, it is possible, for example, to transmit—in addition to the physical layer diagnosis—information by using this second modulation, e.g., in view of the dc voltage, the dc current, the signal amplitude, the interference signals, jitter or subscriber addresses, or other information describing the coupling arrangement or subscriber units connected thereto. By knowing the operating state, the capacity utilization, errors or defects in the bus communication device, in particular in one of the coupling arrangements or in one of the subscriber units, it is possible for the higher-level asset management system to initiate suitable measures.

Until now, data could only be transmitted with the use of prespecified communication, i.e., with the use of the first modulation, via the bus line. A communication through the coupling arrangements themselves was not intended, as a rule. Until now, the coupling arrangements could not be diagnosed and were "invisible" to the asset management system, as it were. If the coupling arrangement effects a galvanic separation of the bus line relative to the at least one connected subscriber unit, an error detection or the diagnosis of at least one subscriber unit by the asset management system was not possible.

Indeed, the communication device as in publication WO 2009/063213 A1 expands the possibilities of diagnosis. However, also in this case a data transmission via the bus line is provided in an exemplary embodiment only if there is no other bus communication. The other embodiments of the communication device in accordance with WO 2009/063213 A1 lead to a targeted error transmission of an error in the branch line or in the subscriber unit causing a bus line state that deviates from the normal state in such a manner that it can be detected by a bus diagnostic unit.

In accordance with the invention, it is possible—by providing the additional communication channel—to transmit information, for example error or other diagnostic data, independently and without impairment of the data transmission consistent with the prespecified communication protocol—additionally and also simultaneously—at the same time as a communication consistent with the first modulation. A complete communication functionality of the coupling arrangement for transmission of data consistent with the communication protocol requires much effort and is expensive, and can be avoided by the embodiment in accordance with the invention.

In one preferred embodiment, the gradient of the current for the second modulation is limited to a gradient maximum value. In doing so, in particular the gradient of the modulation of the current for the first modulation may always range above the gradient maximum value of the second modulation. As a result of this, mutual impairments can be avoided. The additional communication channel thus covers a frequency spectrum that is remote from the first modulation and that display essentially a lower frequency. Inasmuch as, by means of the data transmission, current information that is not time-critical is to be transmitted with the aid of the second modulation, a slower data transmission in a lower-frequency frequency range is possible, without incurring considerable disadvantages—despite a lower data rate compared with the first modulation.

The at least one coupling arrangement and the at least one subscriber unit of the bus communication device cannot receive any information, in particular via the second modulation of the current, but is only disposed to send data to the communication control device, for example the master computer, and/or the higher-level asset management system via the second modulation. This simplifies the design of the coupling arrangement, in particular.

Each coupling arrangement and/or subscriber unit that uses the second modulation can be respectively allocated a characteristic frequency (in the case of a frequency modulation) within a prespecified frequency range or a characteristic correlation function. The characteristic frequencies or correlation functions of a coupling arrangement or a subscriber unit differ from the characteristic frequencies or correlation functions of other coupling arrangements or subscriber units. As a result of this, a type of multiplexing operation can be achieved and several coupling arrangements and/or subscriber units are able to simultaneously send data with the aid of the second modulation of the current. The data continue to be able to be differentiated.

A receiver detects the current signals generated due to the second modulation. The receiver is connected in series to the bus line. In particular, the receiver is associated with the dc voltage source or is an integral part of the voltage supply. For example, a frequently present diagnostic unit for the diagnosis of physical layers can be used as the receiver for signal detection. This receiver can route the signals that have been received due to the second modulation and have been demodulated, in particular, to the asset management system and/or to the communication control device and to the master computer, respectively. Preferably, this routing can take place via the bus line due to the first modulation within the communication protocol or also via a separate transmission line. An already present physical layer diagnostic unit can thus comprise an additional function, namely the diagnosis of the at least one coupling arrangement and/or the at least one subscriber unit.

In one exemplary embodiment, each coupling arrangement may be provided and disposed for allowing respectively only one connected subscriber unit to modulate the consumed current in accordance with the first modulation. The number of coupling arrangements connected to the bus line may be limited. As a result of this, the number of subscriber units and coupling arrangements modulating the consumed current at the same time is also be limited.

For example, by means of a token passing method, the coupling arrangements can always allow a subscriber unit the first modulation. Alternatively, other means for limiting the number of subscriber units that simultaneously modulate the current may be used.

Advantageous embodiments of the invention can be inferred from the dependent patent claims and the description. The description is restricted to essential features of the invention. The drawings are to be used for supplementary reference. Hereinafter, exemplary embodiments of the invention are explained with reference to the appended drawings.

They show in

BRIEF DESCRIPTION OF THE DRAWINGS

FIG. 2 an exemplary schematic representation of the consumed subscriber current of a subscriber unit, said current being modulated by the first modulation;

FIG. 3 a schematic exemplary representation of the coupling arrangement current consumed by the coupling arrangement, said current being modulated by a second modulation;

FIG. 4 a schematic exemplary representation of the current flowing on a bus line;

DETAILED DESCRIPTION

Figure 1:
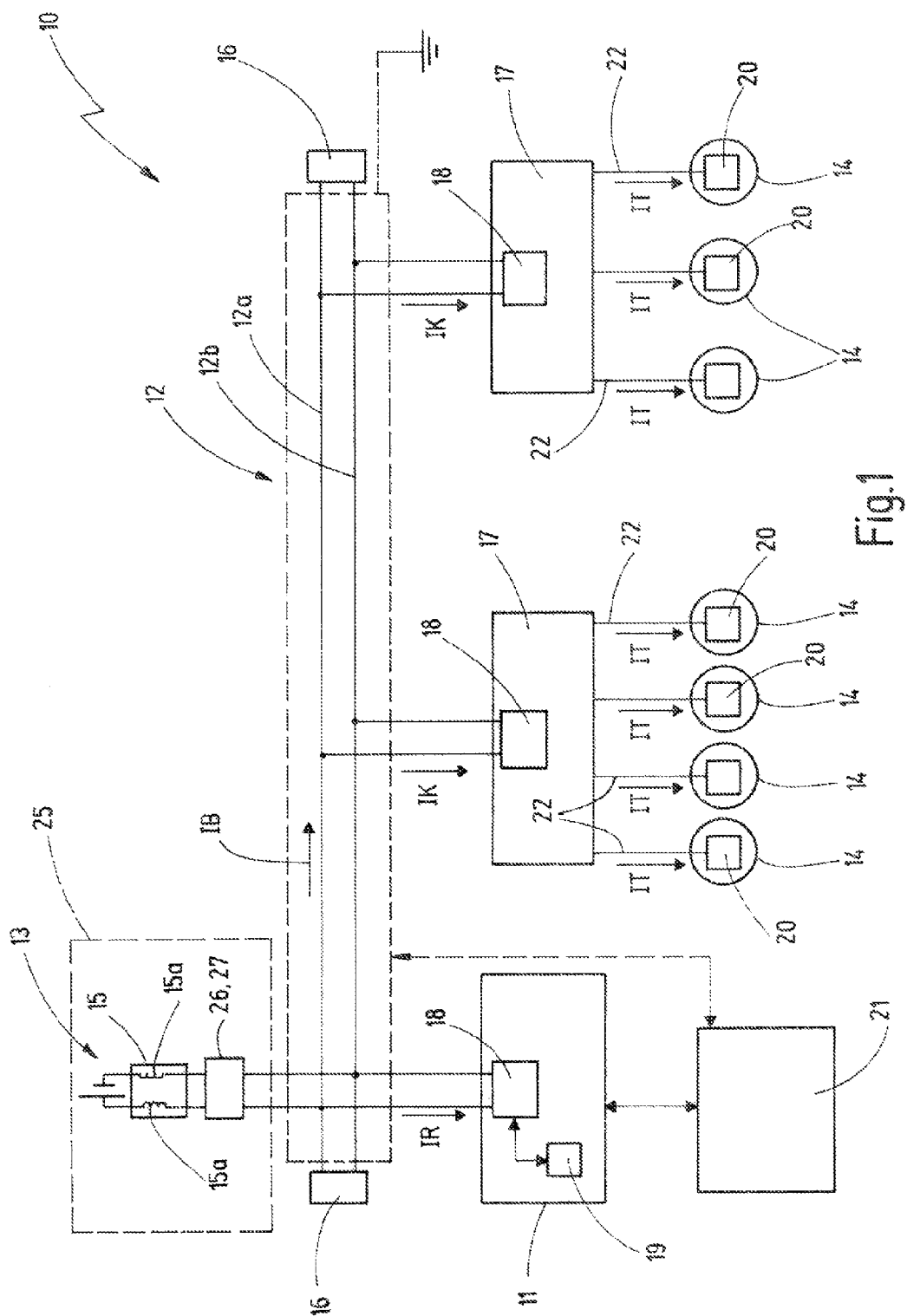
FIG. 1 a block diagram of an exemplary embodiment of a bus communication device.

FIG. 1 shows a block diagram of an embodiment of a bus communication device 10. The bus communication device 10 comprises a communication control device 11, for example a master computer, that is connected to a bus line 12. The master computer is disposed for the control of the communication via the bus line 12, consistent with a pre-specified communication protocol. In accordance with the example, the bus line 12 is configured as a 2-lead, preferably shielded, cable that comprises a first lead 12a and a second lead 12b. In modification thereof, there may also be provided more than two leads 12a, 12b. The leads 12a, 12b may be twisted.

As an alternative to a master computer, the control of the communication may also take place through the subscriber units 14 connected to the bus line 12 on location, as it were. In doing so, the communication control device 11 is given only a limited control task. In this case, the communication control device 11 may also be embodied as an assembly comprising one subscriber unit 14.

Furthermore, connected to the bus line 12 is an energy source, in accordance with the example a voltage supply 25 with a dc voltage source 13. The dc voltage source 13 is disposed for the supply of subscriber units 14 connected to the bus line 12 and for the master computer 11 with electrical energy required for communication, which energy may also be referred to as auxiliary energy. The connection between the dc voltage source 13 and the bus line 12 is established by an intermediate circuit 15. The intermediate circuit 15 may comprise means that avoid a reverse action of the dc voltage source 13 on the voltage and/or current changes occurring on the bus line 12 such as, for example, one or more inductances 15a. Consequently, a short circuit of communication signals by the dc voltage source 13 is avoided.

Furthermore, the voltage supply 25 comprises a diagnostic unit 26. The diagnostic unit 26 is disposed to diagnose the so-called physical layer, also referred to as a bit transmission layer. The physical layer is associated with the devices and bus components of the bus communication device 10. Said physical layer makes available mechanical, electrical and additional functional means in order to activate or deactivate, and maintain physical connections and to transmit signals via said layer.

As an alternative to the exemplary embodiment, the diagnostic unit 26 may also be embodied so as to be separate from the voltage supply 25. Furthermore, it is possible to combine the voltage supply 25 and the communication control 18, 19, of the master computer 11 in one unit that is referred to as a segment coupler in Profibus PA.

At each of its line ends, the bus line 12 is connected to a terminal circuit 16. The terminal circuit 16 may be, for example an RC series circuit with an ohmic resistor and a capacitor in order to avoid reflections at the line end.

The subscriber units 14 are not directly connected to the bus line 12. For coupling, a coupling arrangement 17 is interposed between a subscriber unit 14 and the bus line 12. Connected to each coupling arrangement 17 may be several subscriber units 14 via a respectively 2-lead branch line 22, for example up to eight subscriber units 14. Depending on the application, the coupling arrangement 17 may also have a galvanic separation between the bus line 12 and the connected branch lines 22 and the subscriber units 14, respectively, for example, an optocoupler or transmitter.

The number of subscriber units 14 and/or coupling arrangements 17 connected to each other by the bus line 12 may vary. FIG. 1 shows as an example two coupling arrangements 17 and seven subscriber units 14. In a preferred exemplary embodiment of the bus communication device 10, the number of coupling arrangements 17 is limited, for example to four coupling arrangements 17. Inasmuch as only a limited number of subscriber units 14 can be connected to each coupling arrangement 17, also the number of subscriber units 14 of the bus communication device 10 is limited.

The communication control device 11, as well as the at least one coupling arrangement 17 comprises, in accordance with the example, a signal filter 18 for receiving only relevant communication signals and for blocking other signals. For the modulation and/or demodulation of signals consistent with a first modulation M1, the master computer 11 comprises at least one first modulator-demodulator unit 19. For sending and receiving of data, each subscriber unit 14 comprises one second modulator-demodulator unit 20, respectively.

In the exemplary embodiment in accordance with FIG. 1, there is also a higher-level asset management system 21 that can communicate with the communication control device 11 and/or the coupling arrangements 17. In accordance with FIG. 1, only one bus communication device 10 is connected to the asset management system 21. It is understood that, different therefrom, also several bus communication devices 10 could be connected to a shared asset management system 21.

Figure 5:
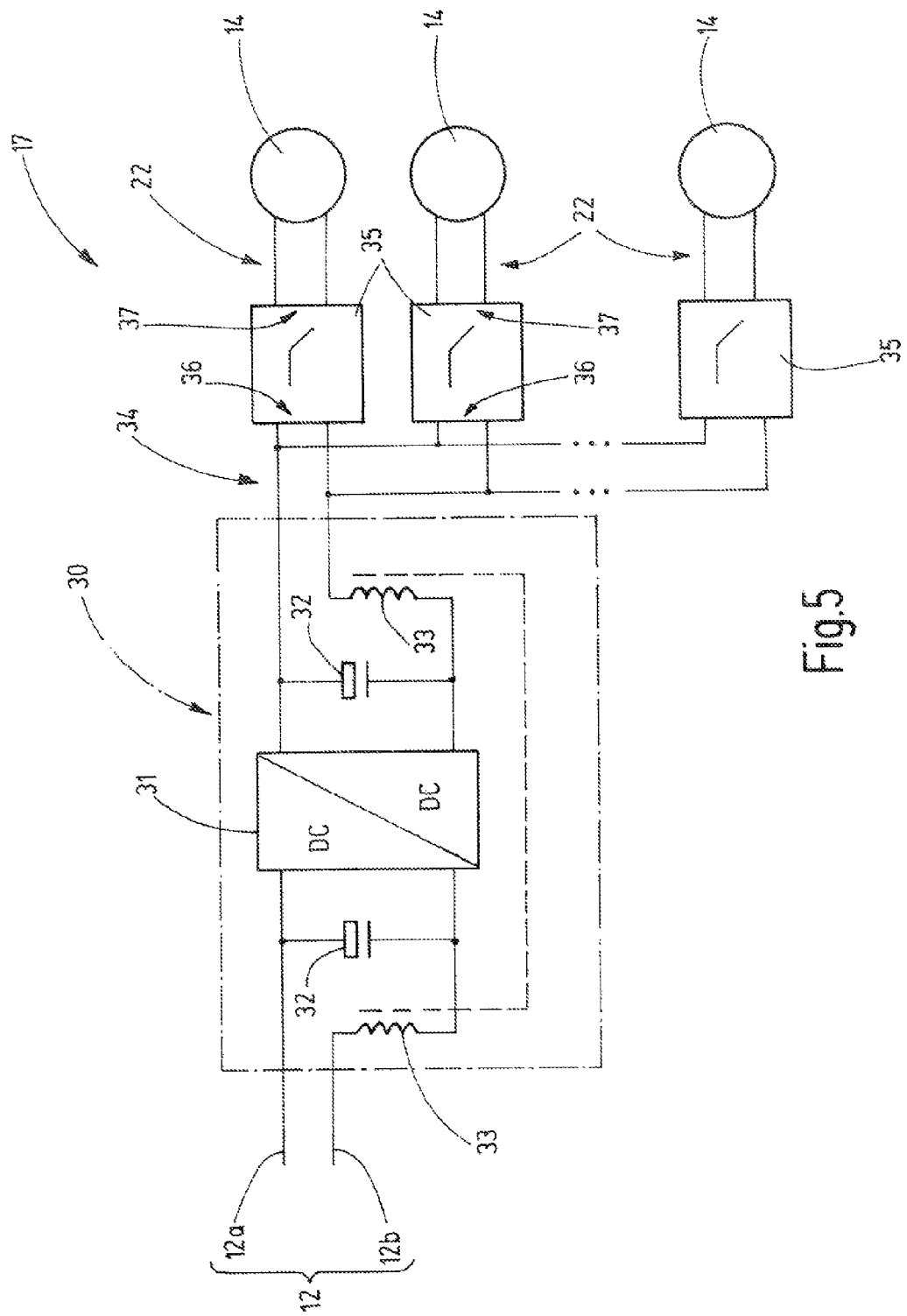
FIG. 5 a block diagram of an exemplary embodiment of a coupling arrangement.

FIG. 5 shows a block diagram of an exemplary embodiment of a coupling arrangement 17. In this exemplary embodiment, there is provided a transmission unit 30 with a dc voltage converter 31. The transmission unit 30 is optional and may be omitted in a simplified embodiment of the coupling arrangement 17.

On the input side and on the output side of the dc voltage converter 31 there is, respectively, one capacitor 32, respectively, connected parallel to the two inputs and to the two outputs by means of which the ac current components can be short-circuited. In one of the two input lines of the dc voltage converter 31, as well as in the corresponding output line of the dc voltage converter 31, there is a transmission coil 33 each, these being coupled to each other. The ac current components—bypassing the dc voltage converter 31—are transmitted via the two coupled transmission coils 33.

On the input side, the transmission unit 30 is connected to the two leads 12a, 12b of the bus line 12 and, on the output side, to a two-lead output line 34. Via the two-lead output line 34, the branch lines 22 to the subscriber units 14 are connected in parallel to the transmission unit 30.

Between the output line 34 and each branch line 22 to one of the subscriber units 14, there is arranged one current limiting arrangement 35, respectively. The number of current limiting arrangements 35 corresponds to the number of connectable subscriber units 14.

Figure 6:
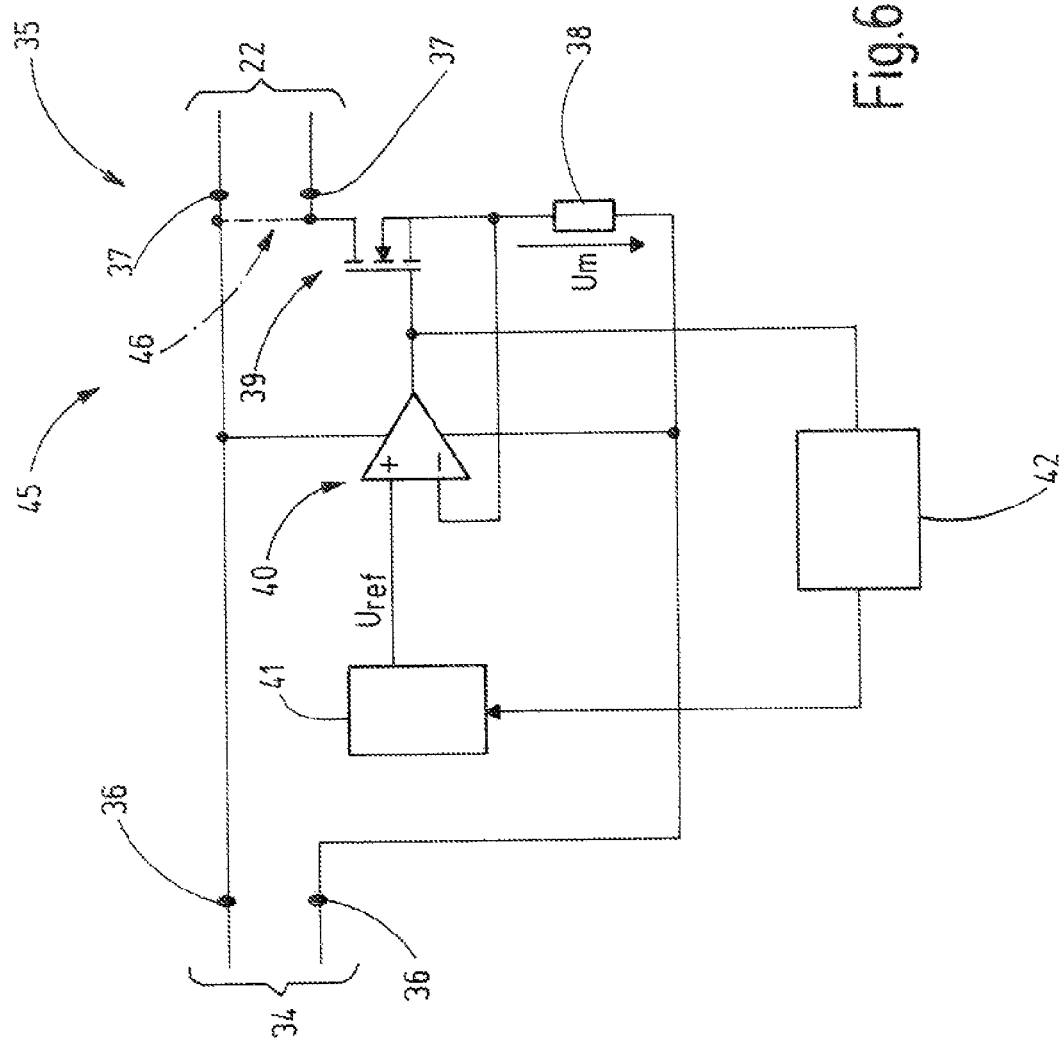
FIG. 6 a block diagram of an exemplary embodiment of a current limiting unit for the coupling arrangement.

FIG. 6 shows a block diagram of an embodiment of the current limiting arrangement 15. One of the two inputs 36 for the connection of the output line 34 is directly electrically connected to one of the two outputs 37 for the connection of the branch line 22. The respectively other input 36 of the current limiting arrangement 35 is connected to the respectively other output 37 of the current limiting arrangement 35 via a measuring resistor 38 and the controlled terminals of a controlled semi-conductor element 39, for example a control transistor. In the exemplary embodiment, the control transistor is a MOSFET; however, alternatively, it may also be a bipolar transistor. In accordance with the example, the measuring resistor 38 is connected to the source terminal of the control transistor and is thus connected in series to the drain-source connection. The drain terminal is connected to the output 37.

The control input of the controlled semi-conductor element 39—in accordance with the example, the gate of the control transistor—is connected to the output of the operation amplifier 40. The inverting input of this operation amplifier 40 is connected to one of the inputs 36 of the current limiting arrangement via the measuring resistor 38, so that the measuring voltage Um applied to the measuring resistor 38 is applied to the inverting input of the operation amplifier 40.

Furthermore, the current limiting arrangement 35 comprises a reference voltage source 41 by means of which a reference voltage Uref is applied to the non-inverting input of the operation amplifier 40. The reference voltage source 41 is activated by a voltage control unit 42 by means of which the dc voltage value of the reference voltage Uref can be varied. The dc voltage value of the reference voltage Uref is set as a function of the output signal of the operation amplifier 40, said signal being transmitted to the voltage control unit 42.

If the current on the output line 34 increases and thus also on the bus line 12, the measuring voltage Um applied to the measuring resistor 38 also increases. As a result of this, the voltage on the control input of the control transistor 39 decreases, as a result of which the current to the output 37 decreases. Consequently, the current at the output 37 and thus the subscriber current IT to the subscriber units 14 can be limited.

The bus communication device 10 in accordance with FIG. 1 operates as is described hereinafter with reference to FIGS. 2 through 4.

In the bus communication device 10, the subscriber current IT consumed by a subscriber unit 14 is modulated consistent with a first modulation M1 consistent with a prespecified communication protocol for the data transmission via the bus line 12. If a subscriber unit 14 modulates the subscriber current IT consumed by said subscriber unit, the coupling arrangement current IK flowing through the associate coupling arrangement 17, as well as the bus line current IB flowing through the bus line 12, are modulated. The communication control device 11, as well as other subscribers 14 connected to the bus line 12 can detect the modulation of the bus line current IB flowing through the bus line 12 and demodulate and evaluate said current by means of the associate modulator-demodulator unit 19 or 20. In this manner, the subscribers 14 can communicate among each another and/or with the master computer 11.

For data transmission, the bus communication device 10 provides a second modulation M2 in addition to the first modulation M1.

In the exemplary embodiment, the first modulation M1 takes place controlled by the master computer with the application of the prespecified communication protocol. This communication protocol may, for example, correspond to the usual protocol of a field bus system such as, e.g., an FF H1 field bus system, or a Profibus A system.

FIG. 2 shows as an example of the first modulation M1 of the subscriber current IT consumed by a subscriber unit 14. Via the bus line 12, the subscriber unit 14 receives an idle current IR that may be, e.g., within the range of 10 to 25 mA. For transmission of data during the first modulation M1, the idle current IR is increased or decreased by a prespecified amplitude, so that said current jumps back and forth between an upper value IH and a lower value IL. The difference between the idle current IR and the upper value IH, as well as between the idle current IR and the lower value IL is the same.

In the exemplary embodiment, the first modulation M1 takes place according to IEC61158-2 and—in accordance with the example—is free of DC components, so that the subscriber current IT effectively consumed by the subscriber unit 14 is not changed by the first modulation M1. In the exemplary embodiment, Manchester coding is applied for the first modulation M1 of the subscriber current IT. A flank descending from the upper value IH to the lower value IL corresponds to the digital value "1", whereas a flank ascending from the lower value IL to the upper value IH corresponds to the digital value "0", or also vice versa. Differential Manchester coding may also be used, wherein the phase position of a clock signal is inverted or not, depending on whether a logic "1" or a logic "0" is being transmitted, in which case there are also two options for the definition of "1" and "0". During this first modulation M1, the time durations during which the subscriber current IT assumes its upper value IH and the time durations during which the subscriber current IT corresponds to the lower value IL, may be selected to be of equal length, as a result of which the mean value of the subscriber current IT remains unchanged.

The first data transmission rate during the transmission of data using the first modulation M1 of the subscriber current IT by a subscriber unit 14 is at approximately 31 kbit per second, for example. The slope of the flank of the current change, i.e., the gradient of the current when the switch occurs between the upper value IH and the lower value IL, is very steep and may be approximately 2900 mA/second. The gradient of the subscriber current IT modulated with the first modulation M1 should be as great as possible, this being schematically illustrated by the vertical current flanks of FIG. 2. The steepness of the current flanks is limited by the available band width of the communication. Consistent with the communication protocol, it is therefore possible to transmit digital data via the bus line 12 by using the first modulation M1.

All subscriber units 14 and the communication control device 11 represented by the master computer can receive, as well as send, digital data generated by the first modulation M1 via their respective modulator-demodulator units 19 and 20, respectively. For communication by means of the first modulation M1, each subscriber unit 14, as well as the master computer 11, can function as the emitter and as the receiver. Analogous to the subscriber units 14, the master computer 11 can modulate the consumed master computer current IR.

The master computer 11 ensures that, at any time, only one of the subscriber units 14 or the master computer 11 itself, performs a first modulation M1 of the respective current IT, IR, so that at all times only one emitter is active at any one time. For example, the master computer 11 can prompt—by a master/slave method—subscriber units 14 to transmit data by the first modulation M1 of the respective subscriber current IT. It is also possible for several master computers 11 acting as masters to be connected to the bus line 12. By a token passing method they can then ensure that respectively only one of the master computers 11 is authorized to send data to or retrieve data from one of the passive subscriber units 14.

In addition to this data transmission proceeding consistent with the communication protocol of the bus communication device 10 due to the first modulation M1, a second modulation M2 of the coupling arrangement current IK by a coupling arrangement 17 is provided. This second modulation M2 is disposed for the unidirectional transmission of data from a coupling arrangement 17 to the communication control device 11 and, in the exemplary embodiment described here, to the master computer. This second modulation M2 of the coupling arrangement current IK can take place at the same time as the first modulation M1 of a subscriber current IT. The two modulations M1, M2 function completely independently of each other. The data transmission with the use of the second modulation M2 is not controlled or defined by the otherwise prespecified communication protocol. Therefore, a further communication channel can be made available on the bus line 12 via the second modulation M2 of the coupling arrangement current IK, without interfering with the first modulation or causing an error. In the exemplary embodiment, status information of a coupling arrangement 17 is transmitted indirectly to the master computer 11 and/or the asset management system 21 on this additional communication channel. For example, the master computer 11 and/or the asset management system 21 can be sent data regarding the capacity utilization of a coupling arrangement 17, the functionality of the latter, the actual operating state or similar status information. It is also possible to transmit any combination of said data.

Different from prior art, the diagnostic unit 26 for the physical layer of the bus communication device 10 can also act as the receiver 27 for the correlated or modulated current signals consistent with the second modulation M2. The signals or information received and obtained via a corresponding correlation function or demodulation are transmitted by the receiver 27 to the communication control device or to the master computer 11 and/or to the asset management system 21. For this purpose, the voltage supply 25 and the receiver 27, respectively, may be connected—via a separate transmission line—to the master computer 11 and/or to the asset management system 21. Alternatively and in accordance with the example, the transmission of data received by the receiver 27 takes place via the second modulation M2 on a bus line 12, consistent with the communication protocol, i.e., in accordance with the first modulation as in the example.

One option for a data transmission consistent with the second modulation that can be implemented in a very simple manner is explained with reference to FIGS. 5 and 6:

If a short circuit occurs in the branch line 22, the control transistor 39 is moved into its blocking state via the operation amplifier 40, so that subscriber current IT will no longer flow. The voltage control unit 42 detects the short circuit status by evaluating the output signal of the operation amplifier. Thereafter, said unit causes—one time only or also cyclically—the generation of a ramp-shaped current progression of the coupling arrangement current IK with one ascending flank and one flank that will descend after a prespecified time, wherein the steepness of the flank is less than the gradient maximum value. This modulation of the current consumption of the coupling arrangement current IK corresponds to a data transmission as in modulation M2, so that—via the bus line 12—the data are transmitted in a manner that a short circuit is detected on one of the branch lines 22 of the coupling arrangement 17. This ramp-shaped progression of the coupling arrangement current IK having two flanks denotes a very simple modulated signal that, depending on coding, comprises one or two bits.

This error condition signal according to the second modulation can be generated repeatedly cyclically via the voltage control unit 42 by an appropriate change of the reference voltage Uref applied to the non-inverting input of the operation amplifier 40. As Soon as the short circuit has been remedied, the coupling arrangement 17 returns to its normal operating state.

In modification of the exemplary embodiment described hereinabove, the circuit of the current limiting arrangement 35 shown in FIG. 6 can also be provided as the modulation circuit 45 in the coupling arrangement 17—with a minor change. In doing so, instead of the branch line 22, a short-circuit connection 46 is interposed between the terminals 37 at the output, as is indicated in a chain line in FIG. 6. A subscriber unit 14 is not connected to the modulation circuit 45. A change of the reference voltage Uref can take place via the voltage control unit 42 that affects the current consumption of the coupling arrangement 17, i.e., the coupling arrangement current IK. The modulation circuit 45 acts as a current sink, as it were. As result of this, the coupling arrangement current IK can be modulated consistent with the second modulation M2. Consequently, any desired digital information consistent with the second modulation can be generated by the coupling arrangement 17 and be transmitted to the bus line 12.

Furthermore, it is possible, by means of the modulation circuit 45, to modulate the coupling arrangement current IK consistent with the first modulation M1, so that the coupling arrangement 17 is imparted with an even more comprehensive communication option.

The modulation circuit 45 and/or the current limiting arrangement 35 can be arranged on the secondary side of the transmission unit 30. Modulations of the current having small gradients G—in particular below the gradient maximum value—are transmitted to the primary side via the dc voltage converter 31 and thus to the bus line 12. Modulations of the current having the greater gradient G—in particular above the gradient maximum value—are transmitted via the coupled transmission coils 33 to the primary side and thus to the bus line 12.

The gradient G of the coupling arrangement current IK is defined by a current change ΔIK within a time period Δt:

$$G = \frac{\Delta IK}{\Delta t}.$$

During the second modulation M2 of the coupling arrangement current IK, this gradient G must not exceed the prespecified gradient maximum value so that there will be no interference with the first modulation. For example, the gradient maximum value may be 1 mA/ms. As can be inferred from the schematic FIGS. 2 and 3, the gradient of the coupling arrangement current IK of the first modulation M1 is greater than the gradient G of the coupling arrangement current IK of the second modulation M2. Preferably, the gradient of the current of the first modulation M1 is always greater than the gradient maximum value applicable to the second modulation M2. As a result of this, influences on the signal with the simultaneous first and second modulations M1, M2 are easier to avoid. For example, the gradient of the current during the first modulation M1 may be approximately 2900 mA/ms.

The second data transmission rate that is achieved with the second modulation M2 of the coupling arrangement current IK is clearly smaller than the data transmission rate achieved by the first modulation M1 and is smaller by several orders of magnitude, for example.

It is also possible to transmit more complex messages via the second modulation M2. The second modulation M2 of the coupling arrangement current IK can be accomplished via a prespecified correlation function or also via a frequency and/or amplitude modulation. In the event of a pure frequency modulation, the frequency range for the second modulation M2 of the coupling arrangement current IK may range between 0 Hz and approximately 100 Hz. The second modulation M2 of the coupling arrangement current IK having a first characteristic frequency f1 may correspond to a digital value "1", for example, whereas the modulation having a second characteristic frequency "f2" may correspond to the digital value "0". The pure frequency modulation, however, may be exposed to interferences by other subscribers and is therefore not always suitable. A correlation function is preferred for the current within the second modulation M2.

By means of a suitable modulation or correlation method applied to the coupling arrangement current IK, it is possible to transmit a digital data word of any length as the status information to the master computer 11, as is schematically illustrated by FIG. 3. In doing so, it is possible to modulate, at the same time, the coupling arrangement current IK of a coupling arrangement 17 by the second modulation M2, and the subscriber current IT of a subscriber 14 by the first modulation M1. As a result of this, the bus line current IB flowing through the bus line can be modulated by at least one second modulation M2 of one of the coupling arrangement currents IK and by a first modulation M1 of one of the subscriber currents IT or the master computer current IR, as has been shown in an exemplary and in a highly schematized manner in FIG. 4.

If several coupling arrangements 17 can simultaneously modulate their respective coupling arrangement current IK consistent with the second modulation M2 and can transmit status information, each coupling arrangement can be allocated a different correlation function, so that the data transmissions consistent with the second modulation will not interfere with each other and can be differentiated on the receiver. As a result of this, a clear detection of the emitter is also possible in the case of the demodulation of the data on the receiver.

The first modulator-demodulator unit 19 of the commutation control device 11 is disposed only for the demodulation in the data transmission via the second modulation M2, because the communication control device 11, in accordance with the example, is configured only for the communication as the receiver.

For the first modulation M1, the signal filter 18 and the terminal units 16 form an impedance Z for the communication signal. During the current modulation, there results a voltage $u(M1)=i(M1)*Z$ that can be sampled by all the units connected to the bus line 12. For the first modulation M1—alternatively to the exemplary embodiment described hereinabove—a voltage modulation is also possible. Depending on the embodiment, the signal filter 18 may also be effective for the second modulation M2; in this case, the resultant voltage signals $u(M2)=i(M2)*Z$ could be detected by all the subscribers. This is not intended in the exemplary embodiment. Current changes outside the first modulation M1 are blocked, in accordance with the example, by the signal filter 18 of the coupling arrangements 17 and are not forwarded to the subscriber units 14, because they—in accordance with the example—do not receive data modulated by the second modulation M2.

As an alternative or in addition to the embodiment described hereinabove, it would also be possible that one or more subscriber units 14 can modulate the subscriber current IT consistent with the second modulation M2 in order to transmit data. In conjunction with this, it is also possible for each subscriber unit 14 to be associated with different correlation functions for the transmission according to the second modulation M2.

The master computer 11 can transmit the status information received from the various coupling arrangements 17 to the asset management system 21. This can operate the bus communication device 10 corresponding to the received and evaluated status information. In this manner, the asset management system 21 can also sample and/or coordinate in a tuned manner several bus communication devices 10 connected to said system.

In the exemplary embodiment described here, the number of provided coupling arrangements 17 is limited. This embodiment of the bus communication device 10 acts as a means for limiting the bus line current IB flowing through the bus line 12 to a maximum value Imax. Inasmuch as not all the coupling arrangements 17 or subscriber units 14 simultaneously reduce their current consumption, the bus line current IB, as a rule, is greater than a minimum value Imin (FIG. 4). However, the dc voltage consumption may also be equal to zero or even be negative if externally supplied subscribers are present. The simultaneous current increase of several subscriber currents IT or coupling arrangement currents IK is limited, so that it is ensured that the maximum bus line current IB flowing through the bus line 12 can be made available by the dc voltage source 13.

The invention relates to a bus communication device 10 with a bus line 12, at least one communication control device 11 connected to the bus line 12, as well as several coupling arrangements 17 connected to the bus line 12, said coupling arrangements being disposed for the connection of respectively at least one passive subscriber unit 14 to the bus line. The subscriber units 14 can communicate bidirectionally among each other and/or with the communication control device 11 consistent with a fixed, prespecified bus protocol. Usually, the bus line 12 is disposed for the supply of the communication control device 11, as well as of the subscriber units 14, with electrical energy for communication. To accomplish this, an electrical energy source, in accordance with the example a dc voltage source 12, is connected to the bus line 12.

If there is no data transmission via the bus line 12, each subscriber unit 14 consumes an idle current IR. By modulating the subscriber current IT consumed by the subscriber unit 14 to values deviating from the idle current IR, it is possible to transmit data via the bus line 12. Each subscriber unit 14 comprises a modulator-demodulator unit 20 that can modulate the subscriber current IT consistent with a first modulation M1. The first modulation M1 of the subscriber current IT takes place consistent with the bus communication protocol. The coupling arrangements 17 can modulate the consumed coupling arrangement current IK consistent with a second modulation M2. The second modulation M2 of the coupling arrangement current IK takes place outside the communication protocol, completely independently of the data transmission, by means of the first modulation M1. The gradient of the coupling arrangement current IK with the second modulation M2 is smaller than a gradient maximum value and smaller than the gradient of the subscriber current IT with the first modulation M1. By means of the second modulation M2, an additional communication path via the bus line 12 is made possible, said path allowing the transmission of small amounts of data such as status information from a coupling arrangement 17 to a receiver, for example the communication control device 11 or the master computer and/or an asset management system 21.

LIST OF REFERENCE SIGNS

10 Bus communication device
11 Communication control apparatus
12 Bus cable
12a Lead
12b Lead
13 DC voltage source
14 Subscriber unit
15 Intermediate circuit
15a Inductance
16 Terminal unit
17 Coupling arrangement
18 Signal filter
19 First modulator-demodulator unit
20 Second modulator-demodulator unit
21 Asset management system
22 Branch line
25 Voltage supply
26 Diagnostic unit
27 Receiver
30 Transmission unit
31 DC voltage converter
32 Capacitor
33 Transmission coil
34 Output line
35 Current limiting arrangement
36 Input
37 Output
38 Measuring resistor
39 Control transistor
40 Operation amplifier
41 Reference voltage source
42 Voltage control unit
45 Modulation circuit
46 Short circuit connection
f1 First characteristic frequency
f2 Second characteristic frequency
IB Bus cable current
IH Upper value
IK Coupling arrangement current
IL Lower value
Imax Maximum value of the bus cable current
Imin Minimum value of the bus cable current
IR Master computer current
IT Subscriber current
M1 First modulation
M2 Second modulation
Um Measuring voltage
Uref Reference voltage

The invention claimed is:

1. A bus communication device (10), comprising:
   at least one coupling device (17) configured to connect to a bus line (12) and to connect to at least one subscriber unit (14) via a respective branch line (22), wherein the at least one couple device (17) is configured to connect to an energy source (13) connected to the bus line (12) to supply the at least one subscriber unit (14) and/or the at least one coupling device (17) with electrical energy,
   wherein the at least one coupling device (17) is configured to receive a subscriber current (IT) flowing over the bus line (12) and provide the subscriber current (IT) into the at least one subscriber unit (14),
   wherein the at least one subscriber unit (14) is configured to perform a first modulation (M1) of the subscriber current (IT) consistent with a prespecified communication protocol, and
   wherein the at least one coupling device (17) and/or the at least one subscriber unit (14) are configured to perform at least one second modulation (M2) of at least one of a coupling arrangement current (IK) flowing in the coupling device (17) and the subscriber current (IT) for communication,
   wherein the at least one coupling device (17) and/or the at least one subscriber unit (14) are configured to perform the at least one second modulation (M2) outside of the prespecified communication protocol of the first modulation (M1) and independently of data transmission by the first modulation (M1).

2. The bus communication device as in claim 1,
   wherein the at least one coupling device (17) and/or the at least one subscriber unit (14) are configured such that the second modulation (M2) of the at least one subscriber and coupling arrangement current (IT, IK) takes place in such a manner that the second modulation (M2) does not impair the first modulation (M1).

3. The bus communication device as in claim 2,
   wherein the at least one coupling device (17) and/or the at least one subscriber unit (14) are configured such that a gradient (G) of the at least one coupling arrangement and subscriber current (IK, IT) during switchover between an upper value (IH) and a lower value (IL) in the second modulation (M2) is limited to a gradient maximum value.

4. The bus communication device as in claim 3, wherein the at least one coupling device (17) and/or the at least one subscriber unit (14) are configured such that the gradient of the subscriber current (IT) during switchover between an upper value (IH) and a lower value (IL) in the first modulation (M1) ranges above the gradient maximum value of the second modulation (M2).

5. The bus communication device as in claim 1, wherein the at least one coupling device (17) and/or the at least one subscriber unit (14) are configured such that the first modulation (M1) modulates the subscriber current (IT) according to Manchester coding.

6. The bus communication device as in claim 1, wherein the at least one coupling device (17) and/or the at least one subscriber unit (14) are configured such that the second modulation (M2) of the at least one coupling arrangement and subscriber current (IK, IT) is performed according to a correlation function.

7. The bus communication device as in claim 1, wherein the at least one coupling device (17) and/or the at least one subscriber unit (14) are configured such that the second modulation (M2) of the at least one coupling arrangement and subscriber current (IK, IT) comprises a frequency modulation and/or an amplitude modulation.

8. The bus communication device as in claim 1, wherein the at least one coupling device (17) and/or the at least one subscriber unit (14) are configured such that a digital data word having at least one bit is transmitted via the second modulation (M2).

9. The bus communication device as in claim 1, wherein the at least one coupling device (17) and/or the at least one subscriber unit (14) acts only as an emitter for data transmission via the second modulation (M2) of the subscriber current (IT).

10. The bus communication device as in claim 1, wherein several coupling devices (17) are connected to the bus line (12).

11. The bus communication device as in claim 10, wherein, for the second modulation (M2), each of the several coupling arrangements (17) and/or each subscriber unit (14) is allocated a characteristic correlation function or one or more characteristic frequencies (f1, f2), differing from the characteristic correlation function or the characteristic frequency or frequencies (f1, f2) of other coupling arrangements (17) and/or subscriber units (14).

12. The bus communication device as in claim 1, wherein the at least one coupling device (17) and/or the at least one subscriber unit (14) are configured such that a gradient (G) of the at least one coupling arrangement and subscriber current (IK, IT) during switchover between an upper value (IH) and a lower value (IL) for the second modulation (M2) is smaller than a gradient of the subscriber current (IT) during switchover between an upper value (IH) and a lower value (IL) for the first modulation (M1).

13. The bus communication device as in claim 1, further comprising a communication control device (11) operatively connected to the bus line (12) and configured to control communication via the bus line (12) in accordance with the prespecified communication protocol.

14. The bus communication device as in claim 1, further comprising an asset management system (21) operatively connected to the bus line (12) and configured to control and/or monitor communication on the bus line (12).

15. The bus communication device as in claim 1, further comprising a diagnostic unit (21) operatively connected to the bus line (12) and configured to diagnose a bit transmission layer of communication on the bus line (12).

16. The bus communication device as in claim 15, wherein the diagnostic unit (21) is configured to receive modulated current signals according to the second modulation (M2) and to transmit information received via the modulated current signals to one or both of a communication control device (11) configured to control communication via the bus line (12) or an asset management system (21) configured to control and/or monitor communication on the bus line (12).

* * * * *